United States Patent [19]

Mitake et al.

[11] Patent Number: 4,910,089

[45] Date of Patent: Mar. 20, 1990

[54] MAGNETIC RECORDING MEDIUM

[75] Inventors: Hiroshi Mitake, Neyagawa; Takashi Wakabayashi, Ibaraki; Hiroshi Suzuki, Kadoma; Nozomu Ueshiba, Hirakata, all of Japan

[73] Assignee: Matsushita Electric Industrial Co., Ltd., Kadoma, Japan

[21] Appl. No.: 230,678

[22] Filed: Aug. 8, 1988

Related U.S. Application Data

[63] Continuation of Ser. No. 46,485, May 6, 1987, abandoned.

[30] Foreign Application Priority Data

May 7, 1986 [JP] Japan ................. 61-104127

[51] Int. Cl.⁴ ............................. G11B 5/74
[52] U.S. Cl. ....................... 428/425.9; 252/62.54; 428/694; 428/900
[58] Field of Search .......... 428/425.9, 694, 900; 252/62.54

[56] References Cited

U.S. PATENT DOCUMENTS

| | | | |
|---|---|---|---|
| 4,152,485 | 5/1979 | Mizamura | 428/900 |
| 4,404,253 | 9/1985 | Kohler | 428/900 |
| 4,431,712 | 2/1984 | Matsufuji | 428/692 |
| 4,497,864 | 2/1985 | Ryoke et al. | |
| 4,521,486 | 6/1985 | Ninomiya | 428/425.9 |
| 4,522,885 | 6/1985 | Funahashi et al. | |
| 4,529,649 | 7/1985 | Takeuchi et al. | |
| 4,529,661 | 7/1985 | Ninomiya | 427/128 |
| 4,533,565 | 8/1985 | Okita | |
| 4,548,873 | 10/1985 | Yamamoto et al. | |
| 4,550,054 | 10/1985 | Yamauchi et al. | |
| 4,571,364 | 2/1986 | Kasuga et al. | |
| 4,576,866 | 3/1986 | Okita et al. | |
| 4,594,174 | 6/1986 | Nakayama et al. | |
| 4,595,640 | 6/1986 | Chernega | |
| 4,613,545 | 9/1966 | Chubachi | 428/900 |
| 4,659,626 | 4/1987 | Fukushima | 428/900 |
| 4,666,784 | 5/1987 | Imukai | 428/425.9 |
| 4,686,145 | 8/1987 | Honda | 428/900 |

Primary Examiner—Paul J. Thibodeau
Attorney, Agent, or Firm—Cushman, Darby & Cushman

[57] ABSTRACT

S/N characteristic and durability of recording medium e.g. video tape or magnetic disket are improved by using as bonding resin used in the magnetic paint to make the magnetic layer a polyester-based polyurethane having a number average molecular weight of 5,000-100,000 and containing at least two hydroxyl group and at least one sulfone bond therein, through improvement of dispersibility of fine magnetic powder in the magnetic paint.

6 Claims, No Drawings

MAGNETIC RECORDING MEDIUM

This is a continuation of application Serial No. 046,485, filed May 6, 1987 which was abandoned upon the filing hereof.

FIELD OF THE INVENTION AND RELATED ART STATEMENT

1. Field of the Invention

The present invention relates generally to a magnetic recording medium usable for magnetic tape or floppy disk, and particularly to a magnetic recording medium having a magnetic layer which is improved in dispersion of magnetic powder, bonding force to non-magnetic substrate and strength thereof.

2. Description of the Related Art

In recent year, with miniaturization and becoming light weight of the magnetic recording apparatuses, magnetic recording mediums are required to have higher recording density. On the other hand, field of usages of the magnetic recording medium becomes wider, and art to give good durability to the magnetic recording medium is advancing. In order to correspond the above-mentioned high recording density, the magnetic powder to be used in the coating type magnetic recording medium, wherein the magnetic layer is made by applying on a base film a magnetic paint comprising fine magnetic powder, binding-resin and solvent as principal materials followed by drying, become more and more fine powder. On the other hand, in general, the dispersibility in the binding-resin of the magnetic powder becomes poor as the magnetic powder becomes finer, and subsequently the insufficient dispersibility induces lowering of characteristics and S/N ratio as the magnetic recording medium.

In order to solve the above-mentioned problems, improvements have been made such that: (1) hydrophilic group is introduced in the binding-resin, or (2) surface of the magnetic powder is denatured to oilphilic property by introducing various surface changing agents.

Some of the above-mentioned conventional arts are described hereafter.

Generally, the surface of the magnetic powder is covered by oxide layer except in rare condition. Usually water molecules are absorbed on the surface of the oxide layer on the magnetic powder, and hydroxyl group is produced by dissociation on the surface of the oxide layer. Accordingly a first art is to improve dispersion of magnetic powder by introducing hydrophilic group in the binding-resin, thereby to increase mutual action with the hydroxyl group on the surface of the magnetic powder. As the hydrophilic group to be introduced in the bindingresin, sulfonic group, carboxyl group, and phosphoric group are known, for a instance by the U.S. Pat. Nos. 4,594,174, 4,576,866, 4,571,364, 4,533,565 and 4,529,661.

A second conventional art is to improve dispersibility in the binding-resin by improving the surface of the magnetic powder to oilphilic nature by making hydroxyl group on the magnetic powder surface react with a surface improving agent. As the surface improving agent, silane coupling agents described in the U.S. Pat. No. 4,529,649 or titanate coupling agent described in the U.S. Pat. No. 4,550,054 are known.

As the art to improve the durability, which is another important characteristic required to the magnetic recording medium, the art of improving running ability by using various lubricants thereby to lower friction coefficient of the surface of the magnetic layer is known. As the lubricants to be used in the conventional art, high class fatty acid, fatty acid ester, fluid paraffin, silicone derivative, fluorine-containing compound, or the like organic lubricants, or inorganic lubricant such as graphite are known, for a instance by the U.S. Pat. Nos. 4,595,640, 4,548,873, 4,522,885 and 4,497,864.

The above-mentioned lubricants are used by dispersing in magnetic paint or by applying on the surface of the magnetic layer as very thin layer. Besides, by improving the dispersibility of the above-mentioned magnetic powder, mutual action between the magnetic powder and the binding-resin is strengthened, thereby the durability can be improved.

However, the above-mentioned conventional arts have the following problems. In the first art of introducing the hydrophilic group in the binding-resin has a problem that when an excessive amount of the hydrophilic group is introduced, compatibility with the solvent when preparing the magnetic paint becomes poor, thereby weakening bonding force between the magnetic layer and the base film. The second conventional art of improving the surface of the magnetic powder to oilphilic nature by using a surface changing agent has a problem that by introduction of the step of changing the surface, the manufacturing step becomes complex and selection of best surface changing agent and controlling of the amount thereof are not easy. Furthermore, the uses of the conventional lubricants do not necessarily give sufficient durability; and when durability of the magnetic recording medium is intended to be improved by mutual action of the magnetic powder and the binding-resin in the conventional art, the durability obtained therefrom is limited and not satisfactory.

OBJECT AND SUMMARY OF THE INVENTION

Accordingly, the purpose of the present invention is to provide a magnetic recording medium having good output characteristic and satisfactory S/N ratio by forming magnetic layer wherein the magnetic powder is sufficiently dispersed and which layer has strong bonding ability to the base film and the magnetic layer itself is strong and durable. In order to attain the above-mentioned object, the magnetic recording medium in accordance with the present invention comprises;

a non-magnetic substrate and a magnetic layer which is formed on the nonmagnetic substrate and containing a binding-resin and magnetic powder dispersed in the binding-resin wherein at least a portion of the binding-resin is a polyester-based polyurethane having a number average molecular weight of 5,000–100,000 and containing at least two hydroxyl group and at least one sulfone bond therein.

DESCRIPTION OF THE PREFERRED EMBODIMENT

Urethane resin is a three-dimensional polymer obtained by a reaction between isocyanates and a compound which has plural hydroxyl groups in its molecule, such as, polyether, polyester, etc. And physical property, workability, physical state, etc. of the urethane can be widely varied by changing combination of the raw materials. Especially, when urethane is used as binder of a paint, a coating which is superior in flexibility, durability against abrasion, durability against bending and folding, resistivity against chemicals, etc. is obtainable. Especially, the urethan resins suitable for the present invention are polyester-based polyurethane, which have number average molecular weight of 5,000–100,000 and have at least two hydroxyl group and at least one sulfone bond in their molecules. One example of outline of chemical formula is as follows:

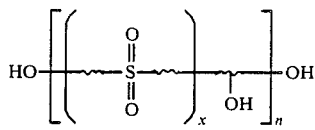

where ~~~ represents polyester chain (partly containing urethane bond and A and B are the same or different hydrocarbons radials).

The urethane-resin becomes the three dimensional polymer by cross linking through reaction of hydroxyl group in the molecules of polyester, etc. and isocyanates. While the conventional polyester usually has diol-structure having hydroxyl groups at both ends of the molecular chain, the polyurethane used in the present invention has the polyol-structure which contains multiple hydroxyl groups in the molecular chain. Accordingly, when forming the cross linking by reaction with isocyanates, distance of the cross linking becomes shorter than that of the conventional polyester resins, thereby a coating layer of high strength is obtainable. Furthermore, since the urethane bonding made by the cross linking is of relatively hydrophilic group, strong mutual action with surfaces of the magnetic powder is obtainable even without introducing particular hydrophilic group in the molecular chain, hence satisfactory dispersion of the magnetic powder is attainable. Furthermore, the urethane bond does not made such undesirable phenomenon as lowering of compatability with solvent or weakening of bonding force to the base film even when urethane group concentration in the urethane resin molecule is high, since the urethane bonding has weaker hydrophilicity in comparison with those of the conventionally used sulfonic group, carboxyl group, phosphoric group, etc.

On the other hand, by inclusion of the sulfone bond in the molecules, the polyurethane used in the present invention has the characteristic as polysulfone, too. Therefore, the magnetic layer formed by using the magnetic point containing the polyurethane has splendid mechanical strength and strong bonding on the base film. Furthermore, since the sulfone bond is of hydrophilic group, mutual action between the binder resin and the magnetic powder surface increases, thereby improving dispersion of the magnetic powder.

The polyurethane used in the present invention makes satisfactory results when number average molecular weight before cross linking reaction with polyisocyanate is 5,000–100,000. When the number average molecular weight is no larger than 5,000, the strength of the coated layer decreases. On the contrary, when the number average molecular weight is above 100,000, dispersion of the magnetic powder therein becomes poor. And the polyurethane resin having the number average molecular weight of 10,000–50,000 has almost optimum characteristics.

As the polyisocyanates used to make the above-mentioned cross linking on the polyurethane, for example, the following conventionally known diisocyanates can be used: tolylenediisocyanate; diphenylmethane-diisocyanate; hexamethylene-diisocyanate; m-xylene-diisocyanate; 1-5-diisocyanate-naphthalin; crude-diphynyl-methanediisocyanate; trimethylolpropanetolylenediisocyanate; etc.

In the magnetic recording medium of the present ivnention, in order to obtain better characteristics, besides the polyurethane, other suitable bonding-resin may be used together. As such other resins, the following are usable: polyvinyl chloride, polyvinyl acetate, vinyl chloride-vinyl acetate copolymer, vinyl chloride-vinyl acetate-vinyl alcohol copolymer, vinyl chloride-acrylic ester copolymer, vinyl chloridemethacrylate ester copolymer, poly acrylic ester, polymethcarylate ester, polyethylene, polypropylene, polystyrene, polyfluoroethylene, polyacetal, polybutadiene, polyamide, cellulose derivatives, polyester resin, phenol resin, epoxy resin, urea resin and melamine resin, and mixture thereof. Especially, cellulose derivatives, polyvinyl chloride, vinyl chloride-vinyl acetate copolymer, vinyl chloride-vinyl acetate-vinyl alcohol copolymer, vinyl chloride-acrylic ester copolymer, vinyl chloride-methacrylate ester copolymer give satisfactory characteristics for dispersibility of magnetic powder, durability of magnetic coating, etc.

As the magnetic powder, abrasive, anti-charging agent, dispersion agent, lubricant, plasticity agent, base film, or the like materials to constitute the magnetic recording medium, any known conventional materials which have been used for the magnetic recording medium of coating type can be used. For the solvent to prepare the magnetic paint, and the manufacturing steps to make the magnetic layer on the base film, any known conventional ones can be used.

<DETAILED DESCRIPTION OF EXAMPLES AND COMPARISON EXAMPLES>

In the following, embodiment of the present invention is explained by comparing it with comparison examples.

In the present embodiment, TAKELAC E-450 (made by Takeda Chemical Industries, Ltd., JAPAN) was used as a polyurethane as a resin satisfying a requirement of the present invention. The TAKELAC E-450 is a polyester-based polyurethane having a number average molecule of about 10,000, and contains hydroxyl group and sulfone bond in its molecule.

On the other hand, in the comparison examples, TAKELAC E-400 and TAKELAK-E 551T were used. The TAKELAC E-400 is a polyester-based polyurethane having a number average molecular weight of about 9000 and contains diol-structure having hydroxyl group at only both ends of its molecular chain. The TAKELAC E-551T is a polyester-based polyurethane having a number average molecular weight of about 20,000, and having branched hydroxyl group besides both ends of its molecular chain. TAKENATE D-103H (made by Takeda Chemical Industries, Ltd.) was used as a polyisocyanate for cross linking reaction.

A magnetic paint having the following composition was prepared by using a ball mill.

| | |
|---|---|
| Co coated $\gamma\text{-Fe}_2\text{O}_3$ magnetic powder | 100 weight part |
| Vinyl chloride-vinyl acetate copolymer resin | 10 weight part |
| Urethane resin (TAKELAC E-450) | 10 weight part |
| Alumina | 5 weight part |
| Carbon black | 5 weight part |
| Oleic acid | 2 weight part |
| Oleyloleate | 8 weight part |

| | |
|---|---|
| Hardener (TAKENATE D-103H) | 6 weight part |
| Methylethylketone | 150 weight part |
| Toluene | 150 weight part |
| Cyclohexanone | 75 weight part |

The magnetic paint having the above-mentioned composition was applied on an polyethylenetelephthalate film having 75 μm thickness in the final thickness of 4 μm. Then, after it went through three processes in the order of drying process, calender process and hardening process, a disk having 5 inches diameter is punched out thereby obtaining a magnetic recording disket.

<COMPARISON EXAMPLE1>

In the composition of the afore-mentioned example, the urethane resin TAKELAC E-450 is replaced by 10 weight parts of other urethan resin TAKELAC E-400, to make a magnetic paint, and a similar magnetic recording disket to that of the example is made. <COMPARISON EXAMPLE 2>

In the composition of the afore-mentioned example, the urethane resin TAKELAC E-450 is replaced by 10 weight parts of other urethan resin TAKELAC E-551, to make a magnetic paint, and a similar magnetic recording disket to that of the example is made.

Concerning the diskets made by the aforementioned preferred example and two comparison examples, measurements are made; measurement results of the magnetic characteristics and gloss of the magnetic layer are shown on Table 1, and measurements results of the durability and bonding force to the base film are shown in Table 2.

The gloss of the magnetic layer is a value representing dispersion of the magnetic powder in the magnetic layer, and the larger gloss value means the better dispersion of the magnetic powder.

The test for durability was made by using a 5" disket drive apparatus available in the market and under the following conditions. The disket was driven by setting a magnetic head to trace the same one track with head pressure of 40 gr., and number of passes when output level become lower than 80 % of the initial level is recorded as durability index.

The measurements are made in three different ambient conditions of 5° C.—10%RH, 25° C. —60%RH and 50° C.—85%RH.

Bonding force of the magnetic layer to the base film is checked by cutting the magnetic layer vertically and horizontally like a checkerboard and counting the number of peeled flakes.

TABLE 1

| | Saturation of magnetization [Gauss] | Coercive force [hOe] | Square Ratio | Gloss of magnetic layer 60°-60° |
|---|---|---|---|---|
| Present embodiment | 2800 | 1.20 | 0.630 | 220 |
| Comparison example 1 | 2800 | 1.30 | 0.615 | 190 |
| Comparison example 2 | 2900 | 1.30 | 0.625 | 210 |

TABLE 2

| | Temperature & relative humidity | | | Bonding force |
|---|---|---|---|---|
| | 5° C., 10% RH | 25° C., 60% RH | 50° C., 85% RH | |
| Present embodiment | below 5,500,000 passes | below 7,500,000 passes | below 6,000,000 passes | 100/100 |
| Comparison example 1 | below 2,000,000 passes | below 4,000,000 passes | below 2,000,000 passes | 90/100 |
| Comparison example 2 | below 3,000,000 passes | below 4,500,000 passes | below 2,500,000 passes | 90/100 |

From Table 1, it is observed that when the urethane resin in accordance with the present invention is used in the magnetic recording medium, from any of the measurement results of the surface luster, coercive force, or square ratio, the improvement of dispersion of the magnetic powder is noticeable. And, there is no deterioration of saturation magnetization by adoption of the making method of the present invention.

From Table 2, it is observed that by use of the urethane resin in accordance with the present invention, improvement of bonding force between the magnetic layer and the base film and of durability of the magnetic layer are clearly noticeable.

What is claimed is:

1. Magnetic recording medium comprising
a non-magnetic substrate and
a magnetic layer which is formed on said non-magnetic substrate and containing a binding-resin and magnetic powder dispersed in said binding-resin.
wherein
at least a portion of said binding-resin is a polyester-based polyurethane having a number average molecular weight of 5,000–100,000 and containing at least two hydroxyl group and at least one sulfone bond therein.

2. Magnetic recording medium in accordance with claim 1, wherein
said polyester-based polyurethane has a number average molecular weight of 10,000–50,000.

3. Magnetic recording medium comprising
a non-magnetic substrate and
a magnetic layer which is formed on said nonmagnetic substrate and containing a binder-resin and a magnetic powder dispersed in said binding-resin, and
wherein
a portion of said binding-resin is a polyester-based polyurethane having a number average molecular weight of 5,000–100,000 and containing at least two hydroxyl group and at least one sulfone bond therein and the remainder is at least on member selected from the group consisting of cellulose derivative, polyvinyl chloride, vinyl chloride - vinyl acetate copolymer, vinyl chloride - vinyl acetate - vinyl alcohol copolymer, vinyl chloride - acrylic ester copolymer, vinyl chloride -methacrylate ester copolymer and a mixture thereof.

4. Magnetic recording medium in accordance with claim 3, wherein
said polyester-based polyurethane has a number average molecular weight of 10,000–50,000.

5. Magnetic recording medium in accordance with claim 3 wherein the remainder of the binding-resin is a vinyl chloride-vinyl acetate copolymer resin.

6. Magnetic recording medium in accordance with claim 5 wherein said polyester-based polyurethane has a molecular weight of 10,000–50,000.

* * * * *